United States Patent
Van De Wiele

(10) Patent No.: US 10,112,442 B2
(45) Date of Patent: Oct. 30, 2018

(54) NON-PNEUMATIC TIRE

(75) Inventor: Hugo Van De Wiele, Lokeren (BE)

(73) Assignee: Artic Investments S.A., Luxembourg (LU)

( * ) Notice: Subject to any disclaimer, the term of this patent is extended or adjusted under 35 U.S.C. 154(b) by 0 days.

(21) Appl. No.: 13/805,194

(22) PCT Filed: Jun. 20, 2011

(86) PCT No.: PCT/EP2011/060227
§ 371 (c)(1),
(2), (4) Date: Aug. 2, 2013

(87) PCT Pub. No.: WO2011/157847
PCT Pub. Date: Dec. 22, 2011

(65) Prior Publication Data
US 2013/0319591 A1 Dec. 5, 2013

(30) Foreign Application Priority Data
Jun. 18, 2010 (EP) ..................... 10166541

(51) Int. Cl.
*B60C 7/10* (2006.01)

(52) U.S. Cl.
CPC ............... *B60C 7/102* (2013.01); *B60C 7/10* (2013.01); *B60C 2007/107* (2013.01)

(58) Field of Classification Search
CPC .. B60C 7/10; B60C 7/102; B60C 7/12; B60C 2007/107
USPC .. 152/1, 5, 7, 246, 323, 324, 325, 326, 327, 152/328
See application file for complete search history.

(56) References Cited

U.S. PATENT DOCUMENTS

| | | | | | |
|---|---|---|---|---|---|
| 887,997 | A | * | 5/1908 | Cadwell | 152/325 |
| 1,362,714 | A | * | 12/1920 | McCollough | B60C 7/12 152/321 |
| 1,616,843 | A | * | 2/1927 | Brubaker | 152/324 |
| 2,603,267 | A | * | 7/1952 | Simpson | 152/7 |
| 2,620,844 | A | * | 12/1952 | Lord | 152/326 |
| 3,219,090 | A | * | 11/1965 | Cislo | 152/7 |
| 3,486,545 | A | * | 12/1969 | Wittneben et al. | 152/155 |
| 4,832,098 | A | * | 5/1989 | Palinkas et al. | 152/7 |
| 5,042,544 | A | * | 8/1991 | Dehasse | 152/302 |
| 6,681,822 | B2 | * | 1/2004 | Adams et al. | 152/7 |
| 2003/0201043 | A1 | * | 10/2003 | Adams et al. | 152/5 |
| 2005/0028914 | A1 | * | 2/2005 | Hill et al. | 152/302 |

(Continued)

FOREIGN PATENT DOCUMENTS

| | | |
|---|---|---|
| EP | 0159888 A2 * | 10/1985 |
| EP | 1731332 A2 | 12/2006 |
| EP | 1894748 A1 | 3/2008 |

(Continued)

*Primary Examiner* — Kip T Kotter
(74) *Attorney, Agent, or Firm* — Jacobson Holman PLLC

(57) ABSTRACT

A tire (1) has a rubber tread portion (2) extending in circumferential direction of the tire (1) and being provided for contacting a ground surface and a truss ring (3), contacting and extending along the tread portion (2) for supporting the vehicle on the tread portion (2), made of truss members (4) forming two circumferential chords (5, 6) concentrically positioned with respect to the tread portion (2) and a truss web (7) interconnecting the chords (5, 6), wherein the truss members (4) are made of a rubber material having an E modulus of between 4-18 MPa.

10 Claims, 5 Drawing Sheets

(56) References Cited

U.S. PATENT DOCUMENTS

2009/0107596 A1* 4/2009 Palinkas et al. .......... 152/209.1

FOREIGN PATENT DOCUMENTS

| EP | 2141030 A1 | 1/2010 |
|----|----|----|
| EP | 2177375 A1 | 4/2010 |
| JP | H01311902 | 12/1989 |
| JP | H11514602 | 12/1999 |
| JP | 2008055928 | 3/2008 |
| JP | 2009035050 | 2/2009 |
| WO | WO 9605917 A1 * | 2/1996 |
| WO | 2009112110 | 9/2009 |
| WO | WO 2009112110 A1 * | 9/2009 |

* cited by examiner

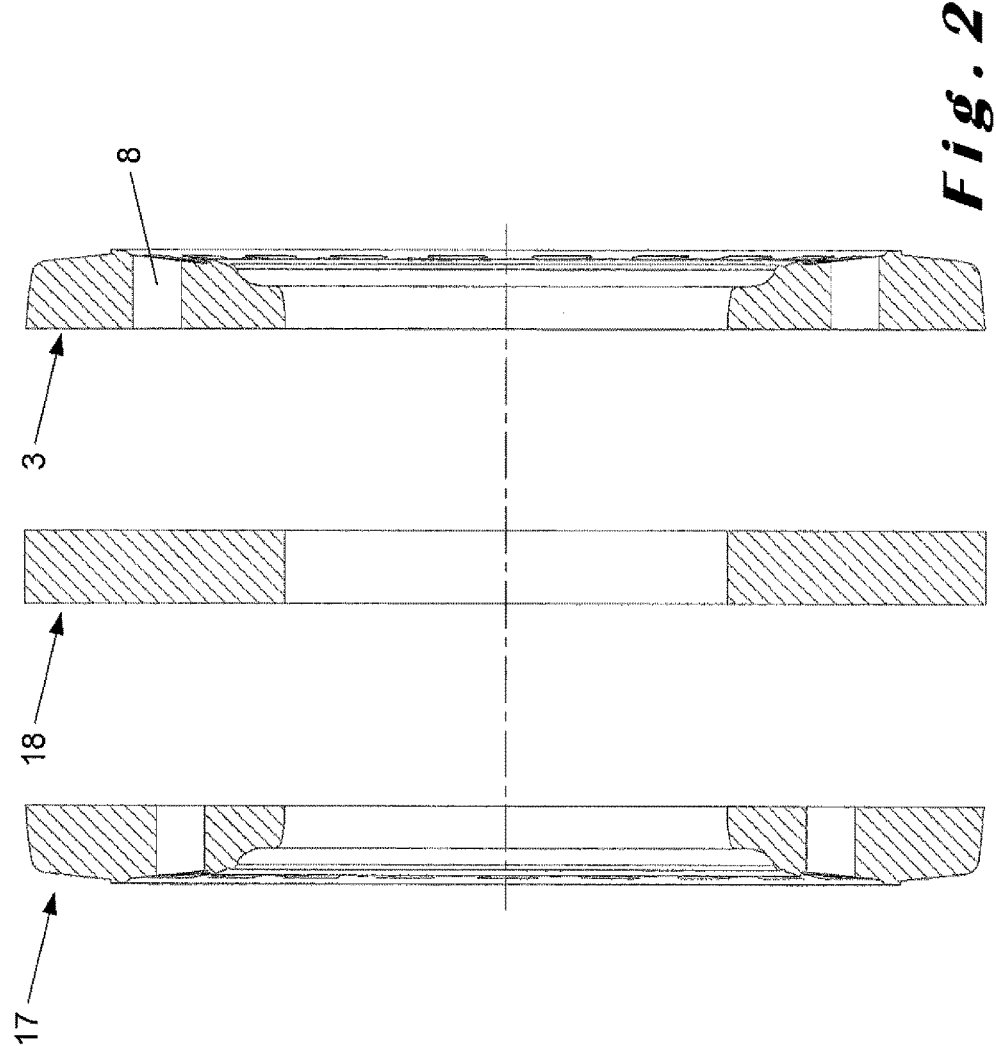

NON-PNEUMATIC TIRE

The present invention relates to a tire according to the preamble of the first claim.

It is known that the safety of a vehicle, either while driving or either during standstill, can be improved by avoiding that an inflated tire of such vehicle suddenly looses its supporting properties due to, for example, a leak in the inflated tire causing air of the inflated tire to suddenly leave the tire. It has also been known to inflate inflatable tires with liquid polyurethane instead of air. After solidification of the polyurethane inside the tire, the tire offers good support properties for the vehicle while driving and during standstill, in the context of the current application respectively called dynamic and static properties. Moreover, when the tire gets punctured, a sudden loss of the supporting properties of the tire is avoided as the polyurethane is solidified and can not leave the tire through a puncture. However, the liquid polyurethane used for filling the tire is relatively expensive, has an ecological issue and if not done correctly still might present a safety risk.

Although a full solid tire provides all required safety aspects, it is often not fulfilling the desired dynamic properties.

A further alternative, not requiring liquid polyurethane but avoiding sudden loss of supporting properties to increase safety and providing improved dynamic properties with respect to full solid tires, is for example marketed by MICHELIN under the name TWEEL. The tire comprises a rubber tread portion extending in circumferential direction of the tire. The tread portion is provided for contacting a ground surface. The tire moreover comprises a truss ring made of a different material, such as polyurethane, polyamide or metallic, integrally formed with a metal rim. The truss ring contacts and extends along the tread portion for supporting the vehicle on the tread portion and is made of truss members forming two circumferential chords concentrically positioned with respect to the tread surface and a truss web interconnecting the chords.

However, such a tire is difficult to produce since the material of the rubber tread portion and the material of the truss members is substantially different. Therefore, the different layers need to be produced in different steps having a substantial impact on the production process.

Therefore, it is an aim of the current invention to provide an alternative tire which is more easy to produce and which avoids the need to be filled with liquid polyurethane but offers similar dynamic and/or static properties as a tire filled with solidified polyurethane and with a decreased risk for a sudden loss of supporting properties.

Thereto, the truss members are made of a truss member material comprising rubber and having an E modulus of between 4-18 MPa and preferably between 6-8 MPa.

When the tread portion is made of rubber and the truss web members also comprise rubber, the connection between the tread portion and the truss web members is easier then when the tread portion and the truss members are, for example, made of respectively rubber and polyurethane or another polymer. It also becomes possible to make the entire tire of rubber, as is for example common with solid rubber tires according to the state of the art, such that the entire rubber tire can be made starting from a green tire using standard curing techniques in a mold. In such a case, no substantial changes have to be made to existing facilities for making rubber tires, more in particular solid rubber tires, for making the tire according to the invention.

It has moreover been found that such truss members allow to make a tire having properties which are similar to the properties of a tire inflated with polyurethane as described above. However, the use of liquid polyurethane can be avoided.

Especially the radial deflection under load of such a tire has been found to be similar to the radial deflection of a tire filled with polyurethane as described above. Comparative tests have been conducted comparing the radial deflection of a respective air inflated, polyurethane filled and solid tire with the radial deflection of a tire according to the invention, all having a width of 13.00 and a diameter of 24, 13.00 and 24 being code designated ciphers in which 13.00 is 13.00 inch and 24 is 24 inch, 13.00 inch being more or less 330 mm and 24 inch being more or less 610 mm (generally denoted by 13.00-24). The radial deflection was measured according to standard SAE-J2704 under a nominal load of 6500 kg. The radial deflection of the air inflated tire was 58.0 mm, of the polyurethane filled tire was 50.0 mm, of the solid tire was 35.0 mm and of the tire according to the invention was 48.0 mm. From this comparison it becomes clear that the tire according to the invention comes the closest to both the air filled tire and the polyurethane tire compared to the solid tire. The value also is strikingly similar with that of the polyurethane filled tire such that a similar radial deflection is obtained without having to fill a tire with polyurethane. Also, the value is close to the value for the radial deflection of an air filled tire with a reduced risk of having a sudden loss of supporting properties.

According to preferred embodiments of the tire, the truss member material is substantially rubber or even just rubber, further increasing the above-described ease of production.

According to preferred embodiments of the tire according to the current invention, the ratio of the areas, at the outer surface of the truss ring, of the truss web members with respect to the openings between the truss web members is comprised between 30/70 and 70/30 and preferably between 40/60 and 60/40 and most preferably 60/40. It has been found that such a ratio of the areas, at the outer surface of the truss ring, of the truss web members with respect to the openings between the truss web members, also called land/sea ratio, allows to further increase the dynamic and/or static properties of the tire. Especially, when the truss member material has an E modulus of between 4-18 MPa and more especially when the E modulus is between 6-8 MPa, such a land/sea ratio provides the tire according to the invention with properties resembling even better the properties of a pneumatic tire filled with polyurethane, as described above.

According to preferred embodiments of the tire according to the current invention, the truss ring is provided such that pairs of truss web members extend from opposing sides of the respective truss chord members such that a layer of adjacent triangular openings delimited by truss members is formed at a first outer surface of the truss ring, the openings extending towards, and more preferably up to, a second outer surface of the truss ring opposing the first outer surface of the truss ring along the rotational axis of the tire. Such an organization of the truss web members with respect to the truss chord members has been found to further increase the dynamic and/or static properties of the tire. It has been found that especially the static properties of the tire improve due to the presence of the triangular openings.

According to further preferred embodiments of the tire according to the current invention, first opposing sides, being the opposing sides of the respective truss chord members of the circumferential chord positioned closest to the tread portion with respect to the other circumferential chord, are positioned with respect to a tread pattern of the tread portion such that the respective first opposing sides are positioned under a respective lug of the tread pattern. Such a positioning of the first opposing sides has been found to allow a good distribution of load from the lugs of the tread pattern to the truss ring and has been found to allow provide improved static and dynamic properties for the tire.

According to further preferred embodiments one of the truss web members and the truss chord member of a pair of truss web members and a truss chord member forming a triangular opening at the first outer surface of the truss ring, delimit at least one angle of the triangular opening which is smaller than the other angles of the triangular opening. Providing the truss web members in such a way allows controlling the deformation under load characteristics of the truss members during load of the tire either while driving, dynamic load, or during standstill, static load, as such an angle provide the truss web members with a controlled load-deformation characteristic In further preferred embodiments of the tire according to the invention, the angle is between 30° and 70° such that an even improved control of the load deformation characteristic of the truss members is achieved.

In further preferred embodiments of the tire according to the present invention, the triangular openings are congruent to provide substantial homogeneous distribution of load when subjected to a static load and to provide substantial continuous dynamic properties, i.e. a substantial continuous support of the vehicle by the tire while driving.

In further preferred embodiments of the tire according to the present invention, the triangular openings in between the truss members narrow from the first outer surface of the truss ring towards, and more preferably up to, the second outer surface of the truss ring. Such an opening offers more easy creation by curing a green tire in a mold, as removal of parts of the mold present in the openings is more easy with openings shaped as such. Moreover, when material, such as for example ground material or mud, unwontedly enters the opening, the narrowing shape of the opening allows pushing the material out off the opening when the truss members delimiting the opening are subject to bending, for example under dynamic load.

In further preferred embodiments of the tire according to the present invention, the triangular openings in between the truss members narrow stepwise. Such stepwise narrowing increases the effect of the pushing of material out off the opening. Without wanting to be bound to any theory, it is believed that this is caused by stress in the material at the location of the steps further decreasing the attachment of the material to the truss members.

In further embodiments of the tire according to the invention, the cross section of the triangular openings at the first outer surface of the truss ring gradually changes to a substantial circular cross section at the second outer surface of the truss ring. Such an arrangement has been found to offer a good balance between good dynamic properties and good static properties as the triangular form has been found to offer good static properties whereas the substantial circular cross section has been found to offer improved dynamic properties.

In further improved embodiments of the tire according to the present invention, the tire comprises a first and a second, different from the first, of said truss rings respectively extending axially over a first and a second length. The second truss ring can for example be different from the first truss ring in location along the axis of the tire, for example when they are not adjacent to each other, when they have different truss members resulting in, for example, a different land/sea ratio, different material for the truss members, different dimensions of the truss members, different relative position of the truss members with respect to each other, for example resulting in a phase difference in the periodicity of the occurrence of the truss members, etc. Such a configuration has been found to offer different properties to a tire under dynamic or static load. It has been found that specific embodiments can be developed for tires for different applications. Examples illustrating different possibilities are given below.

The present invention is further illustrated in the accompanied figures and description of the figures.

FIG. 1b shows an exploded view of the tire according to FIG. 1a.

FIG. 2 shows a side view of a cross-section of the tire shown in FIG. 1b.

FIG. 4 shows a detail of the tire shown in FIG. 1a.

FIG. 5 shows a detail of the tire shown in FIG. 1a.

Figure 1A:
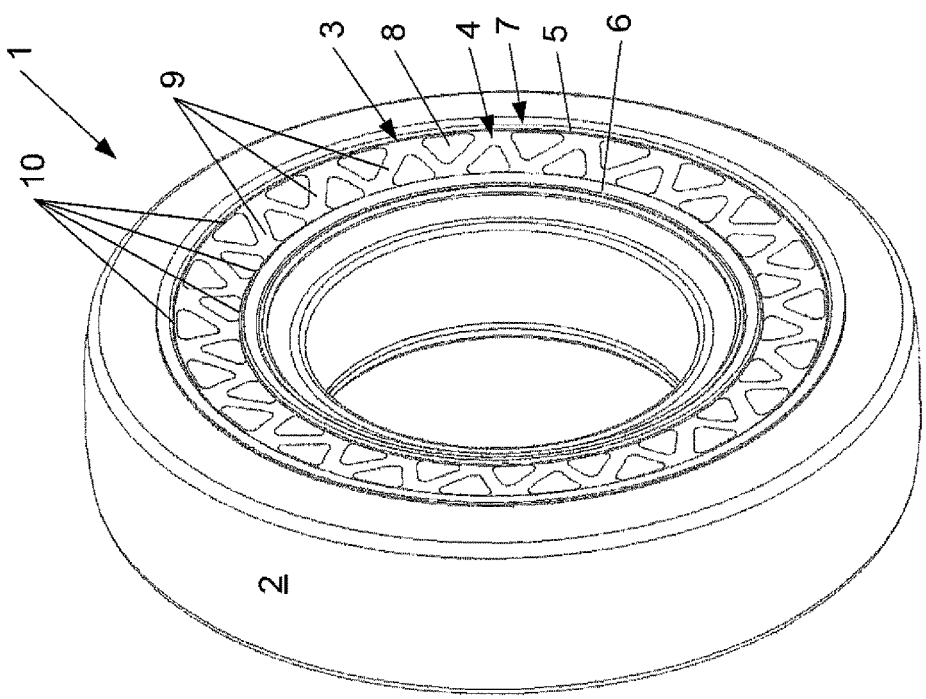
FIG. 1a shows an overview of an embodiment of the tire according to the present invention.

Tire: 1
Tread portion: 2
Truss ring: 3
Truss members: 4
First circumferential chord: 5
Second circumferential chord: 6
Truss web: 7
Opening between truss web members: 8
Truss web members 9
Truss chord members 10
First opposing side: 11
Second opposing side: 12
Lug 13
First outer surface 14
Second outer surface 15
First angle 16
Additional truss ring 17
Intermediate portion 18
First delimiting side 19
Second delimiting side 20
Third delimiting side 21
Second angle 22
Third angle 23
First radius of curvature 24
Second radius of curvature 25
Third radius of curvature 26
Fourth radius of curvature 27
Fifth radius of curvature 28
Sixth radius of curvature 29

Figure 5:
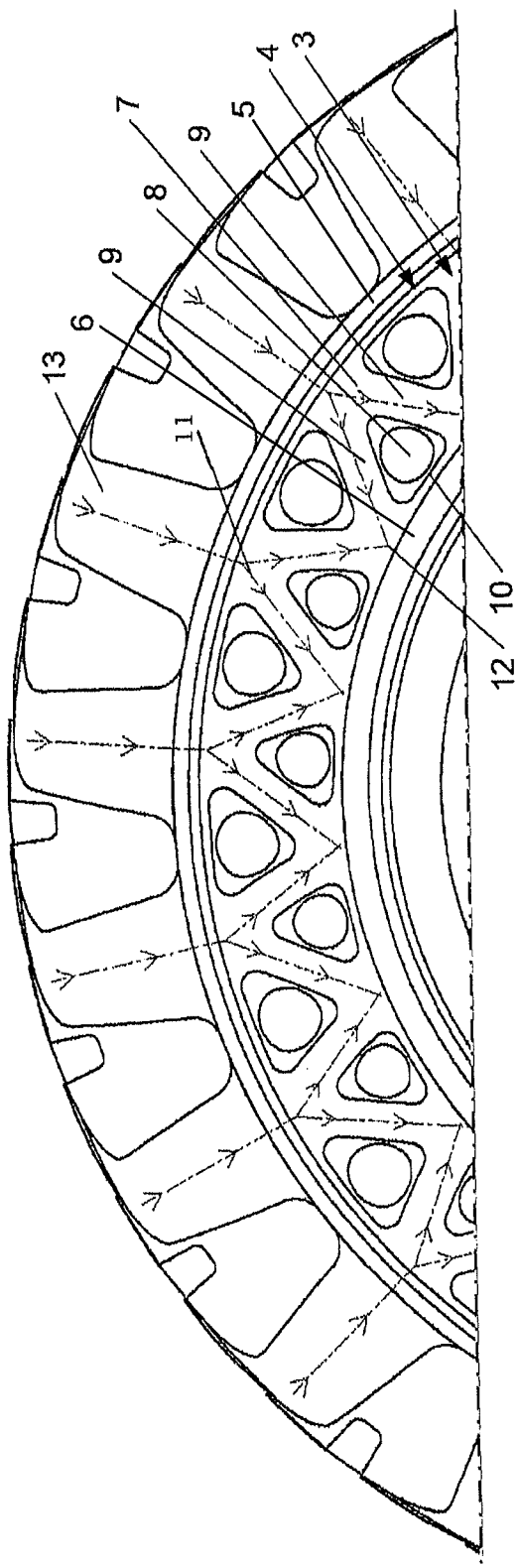

FIG. 1a shows a tire 1 comprising a rubber tread portion 2 extending in circumferential direction of the tire 1 and provided to contact a ground surface. The tread portion 2 preferably is provided with a tread pattern with lugs 13, as shown in FIG. 5. The specific design of the tread portion 2 is however not critical for the invention and can further be determined by the person skilled in the art. The tread pattern can for example be specifically provided to drive in wet and/or dry conditions, etc. or can specifically be provided to the specific ground surface on which it will be used.

The tire 1 can be provided to be mounted on any type of known vehicle such as for example, but not limited to, cars, trucks, etc.

The tire 1 further comprises a truss ring 3. The truss ring 3 contacts and extends along the tread portion 2 for supporting the vehicle on the tread portion 2. The truss ring 3 is made off of truss members 4. The truss members 4 form two circumferential chords 5, 6. The circumferential chords 5, 6 are concentrically positioned with respect to the tread portion 2. A truss web 7 interconnects the chords 5, 6. The truss members 4 making up the circumferential chords 5, 6 are called truss chord members 10 while the truss members 4 making up the truss web 7 are called truss web members 9. The circumferential chord 5 closest to the tread portion 2 is called the first chord 5, whereas the circumferential chord closest to the rotational axis of the tire 1, is called the second circumferential chord 6.

The material of the truss members has an E-modulus of between 4-18 MPa, preferably between 4-10 MPa and most preferably between 5 and 8 MPa, such as for example 5 MPa.

Preferably, the truss member material is rubber, more preferably the truss member material is rubber chosen such that after vulcanization the tread portion and the truss members form a substantially uniform, preferably a uniform, unit such as, for example, when the truss member material and the material of the tread portion is substantially the same.

Figure 4:
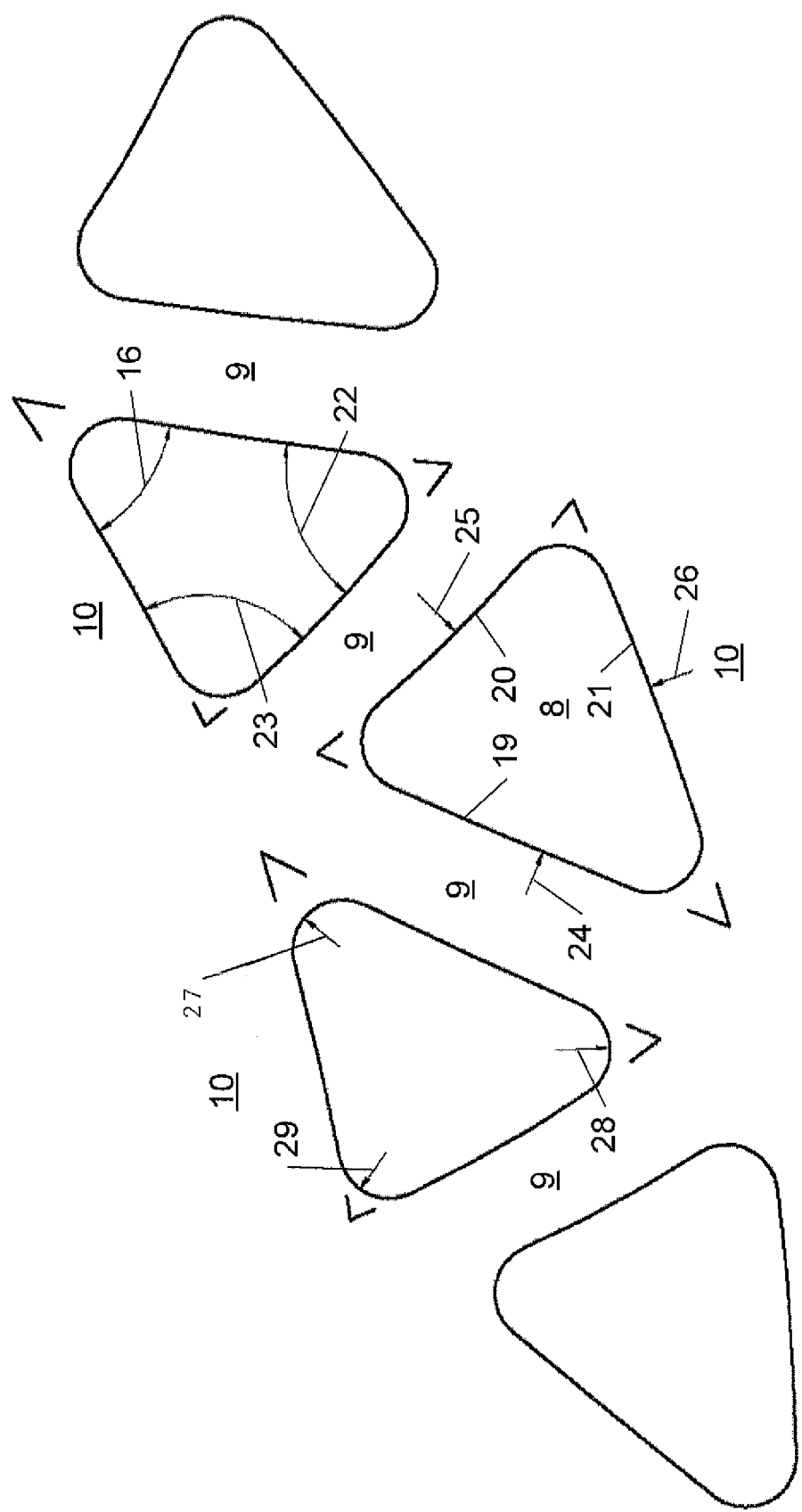

The truss members 4 shown in FIGS. 4 and 5 have a substantial constant width at the outer surface 14 of the truss ring 3. This is however not critical for the invention and the width can for example change along the length direction of the truss member 4.

The truss members 4 delimit openings 8, as is shown in the figures. The dimensions and the form of the openings is not critical for the invention as long as the truss ring 3 is provided to support the vehicle on the tread portion keeping in mind that similar dynamic and/or static properties as a tire filled with solidified polyurethane or being envisaged. In this respect optimal results are being obtained with tires wherein the ratio of the areas, at an outer surface of the truss ring 3, of the truss web members 9 with respect to the openings 8 between the truss web members 9, i.e. the land/sea ration, is comprised between 30/70 and 70/30 and preferably between 40/60 and 60/40 and most preferably 47/53.

Preferably, the openings 8 are triangular and are delimited by a truss chord member 10 and two truss web members 9 extending from opposing sides 11, 12 of the truss chord member 10 and towards each other. This configuration is showed in detail in FIGS. 4 and 5.

Figure 1B:
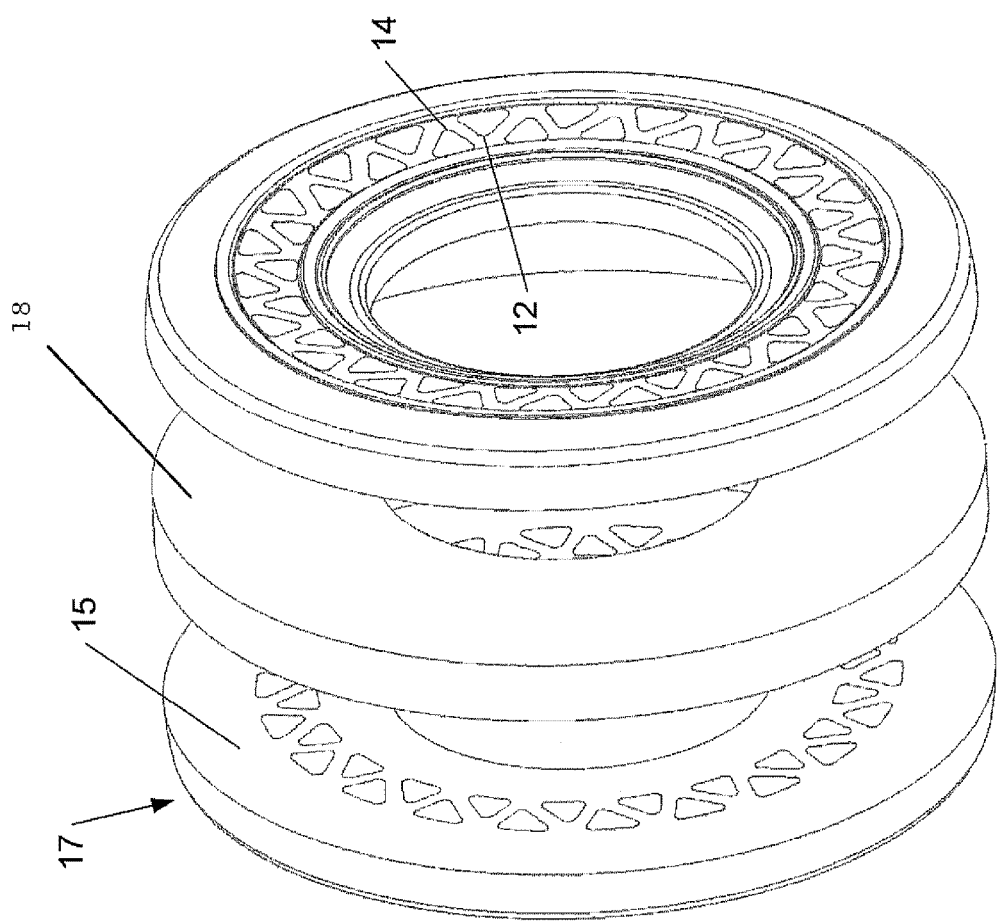

More preferably, as shown in detail in the figures, the truss is a warren truss and the openings 8 are such that a layer of adjacent triangular openings 8 delimited by truss members 4 is formed at a first outer surface 14 of the truss ring 3. Preferably, the openings 8 extend towards a second outer surface 15 of the truss ring 3 opposing the first outer surface 14 of the truss ring 3 along the rotational axis of the tire 1, as shown in FIG. 1b. As shown in FIG. 1b, the opening 8 may extend up to the second outer surface 15. This is however not critical for the invention and the opening 8 may also only partially extend through the truss ring 3, as for example shown in FIGS. 3a and 3b.

FIG. 5 shows a preferred positioning of the lugs 13 of a tread pattern of the tread portion 2 with respect to the openings 8 of the truss ring 3. In the embodiment shown, the opposing sides of the respective truss chord members 10 of the first circumferential chord 5, are positioned with respect to the tread pattern such that the respective first opposing sides 11 are positioned under the respective lugs 13 of the tread pattern. FIG. 5 further illustrates the load distribution in such a tire 1. However, depending on the desired characteristics for the tire 1, the openings 8 can also be positioned under the lugs 13, for example to offer a more resilient tire 1, for example offering more comfort when used for supporting a vehicle for carrying passengers.

As can be seen from FIG. 5, two concentric rows of triangular openings 8 which are equidistant from the rotational axis of the tire 1 are present, a first row of openings 8 comprising respective truss chord members 10 of the first circumferential chord 5 and a second row of openings 8 comprising respective truss chord members 10 of the second circumferential chord 6. Preferably, as shown in FIG. 5, the openings 8 of the first row preferably are substantially identical, or identical, to each other and the openings 8 of the second row preferably are congruent, i.e. having substantially the same shape, more preferably substantially identical, or identical, to each other. When the openings 8 of the first and the second row respectively are congruent or are even substantially identical, or identical, it has been found that the tire 1 offers a more homogeneous support during driving.

Figure 3B:
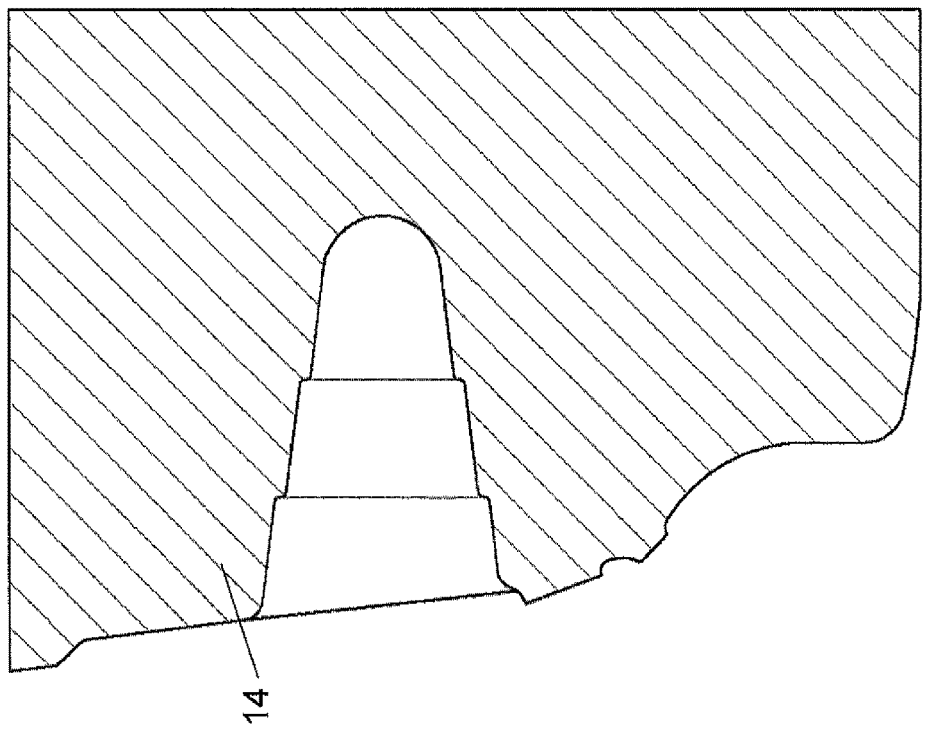
FIG. 3b shows a cross section of a detail of another embodiment of the tire shown in the previous figures.
Figure 3A:
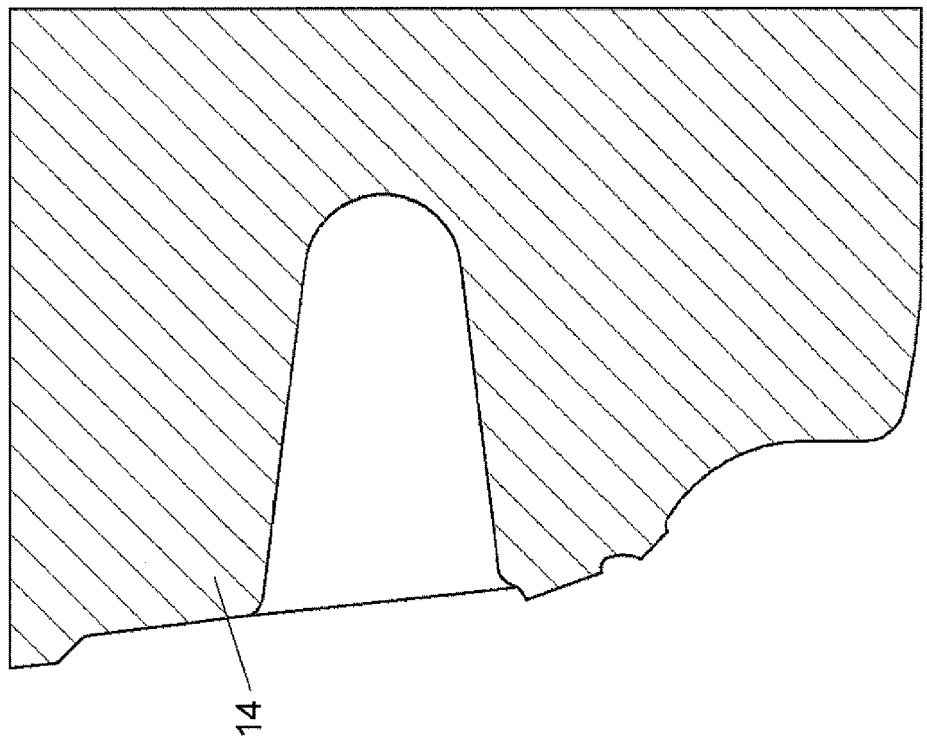
FIG. 3a shows a cross section of a detail of a different embodiment of the tire shown in the previous figures.

FIGS. 3a and 3b show that the opening 8, preferably the triangular opening 8, narrows from the first outer surface 14 towards the second surface 15, i.e. tapers towards the second surface 15 of the truss ring 3.

FIG. 3a and FIG. 3b show a cross-section of an opening 8. The opening 8 shown in FIG. 3a is substantially smooth. This is however not critical for the invention and can be determined by the person skilled in the art depending on the desired characteristics of the tire 1, the ground surface on which the tire 1 will primarily will be used, etc. FIG. 3b instead shows a cross-section of an opening 8 which narrows, i.e. tapers, stepwise. This is however not critical for the invention and, as shown in FIG. 3a, the opening 8 may taper continuously.

In both openings 8 shown in FIG. 3a and FIG. 3b respectively, the cross section of the triangular openings 8 at the first outer surface 14 of the truss ring 3 gradually changes to a substantial circular cross section at the second outer surface 15 of the truss ring 3. This is however not critical for the invention and the cross section at the second outer surface 15 of the truss ring 3 can have any shape deemed appropriate by the person skilled in the art. The opening 8 could, for example, have a conical cross-section ending in a substantially sharp tip, however for reasons of fatigue life rounded edges are preferred FIG. 5 shows a detailed view of some openings 8 at the first outer surface 14 of the tire 1. Each opening is delimited by delimiting sides which are part of the truss members 4. The curvature, expressed with its radius of curvature, of the different delimiting sides of the opening 8 can be determined in function of the desired deformation of the opening 8 under load, for example during use of the tire 1 and can for example be infinite, positive, negative, etc. FIG. 4 specifically shows a triangular opening 8 having a first delimiting side 19 and a second delimiting side 20 which are both part of truss web members 9 and a third delimiting side 21 which is part of a truss chord member 10. A respective first, second and third radius of curvature 24, 25, 26 are indicated for the respective first, second and third delimiting sides 19, 20, 21. This is however not critical for the invention and the radiuses of curvature can also point outwardly depending on the desired characteristics of the tire 1.

Preferably, the absolute value of the radiuses of curvature are chosen between 100 mm en 1500 mm, More preferably between 300 mm and 1300 mm. For example, the first 24, the second 25 and the third 26 radius of curvature, being the radiuses of curvature of the truss members of the first row 5 of openings is respectively 1226 mm (truss web member with first delimiting side 19), −304 mm (truss web member with second delimiting side 20) and 657 mm (truss chord member with third delimiting side 21), wherein a positive radius of curvature extends from within the opening 8 and a negative radius of curvature extends from out off the opening 8. The radiuses of curvature of the truss chord members 10 of the second row of openings 8 being −571 mm, of the truss web members of the first row of openings adjacent with the truss web member 9 providing the second delimiting side 20 of the first row of openings being 304 mm and of the other truss web member of the opening 8 of the second row of openings being −1245 mm, wherein a positive radius of curvature extends from within the opening 8 and a negative radius of curvature extends from out off the opening 8.

The delimiting sides 19, 20, 21, intersecting each other, enclose an angle 16, 22, 23. Preferably and as shown in FIG. 4, one of the truss web members 9 and the truss chord member 10 of a pair of truss web members and a truss chord member forming a triangular opening 8 at the first outer surface 14 of the truss ring 3, delimit at least one angle 16 of the triangular opening 8 which is smaller than the other angles of the triangular opening 8. This is however not critical for the invention and any other shape for the opening 8 deemed appropriate by the person skilled in the art can be used. Preferably, the angle 16 is between 30° and 70°, more preferably between 45° and 55° and most preferably between 46° and 52°. For example, the first second and third angle of an opening of the second row of openings is respectively 46.9°; 67.5° and 65.6°, wherein the second angle is formed between the two truss web members 9, the third angle is formed between the truss chord member 10 and a truss web member 9. For example, the first second and third angle 16, 22, 23 of an opening of the first row of openings is respectively 51.3°; 55.3° and 73.4° wherein the second angle is formed between the two truss web members 9, the third angle is formed between the truss chord member 10 and a truss web member 9.

Preferably, the angles 6, 22, 23 are rounded, to avoid occurrence of cracks in the truss web material due to build-up of stress. The radius of curvature of the rounded angles preferably is between 10 mm and 15 mm, more preferably between 11 mm and 12 mm and most preferably is 11.5 mm.

The length of truss members 4 measured from the points at which the delimiting sides would intersect if rounded angles would not be present preferably is between 50 mm and 200 mm, more preferably between 70 mm and 110 mm and most preferably between 80 mm and 105 mm. For example, the length of the web members 4 of an opening 8 of the first row 5 of openings is respectively 101.4 mm (truss web member with first delimiting side 19), 81.4 mm (truss web member with second delimiting side 20) and 102.9 mm (truss chord member with third delimiting side 21). The length of the truss chord members 10 of the second row of openings 8 being 85.8 mm, of the truss web members of the first row of openings adjacent with the truss web member 9 providing the second delimiting side 20 of the first row of openings being 81.4 mm and of the other truss web member of the opening 8 of the second row of openings being 100 mm.

Preferably, the width of a truss web member is between 10 mm and 50 mm, more preferably between 20 mm and 40 mm, most preferably between 25 mm and 30 mm, for example 28 mm.

The different parameters of the dimensions of the truss web members 4 and the openings 8, are chosen in function of the desired land/sea ratio and/or tire geometry FIG. 1b shows that the tire 1 comprises a first and a second of said truss rings 3, 17 respectively extending over a first and a second length along the rotational axis of the tire 1.

FIG. 1b moreover shows that the tire 1 also comprises a disc 18, for example a rubber disc, extending over a third length along rotational axis of the tire 1. The disc 18 also contacts and extends along the tread portion 2 around rotational axis of the tire 1 for supporting the vehicle on the tread portion 2. The disc 18 is sandwiched between the two truss rings 3, 17.

The length along which the truss rings 3, 17, the truss ring width, and the disc 18, the disc width, extend along the rotational axis of the tire 1 can be determined by the person skilled in the art depending on the envisaged properties of the tire 1. Preferably, although not critical for the invention, the truss ring widths are substantially the same. In a first example, the disc width is 50% of the total width of the tire 1, measured along the rotational axis of the tire 1, while the widths of the truss rings are respectively 25% of the total width of the tire 1. In a second example, the truss ring widths and the disc width each is one third of the total width of the tire 1.

Such a configuration of the truss rings 3, 17 and the disc 18, if present, is however not critical for the invention and other configurations are possible.

For example more or less than two truss rings 3, 17 are possible in the tire 1. For example, the tire 1 can comprise one, three, four, five, six, seven, eight, etc. truss rings. Each truss ring can be adapted to specific desired properties, being dynamic and/or static by specifically adapting the form, dimension of the openings, by changing the truss member material, etc.

For example more or less than one disc 18 is possible in the tire 1. For example, the tire 1 can comprise no, one, two, three, four, five, six, seven, eight, etc. discs. Each disc can be adapted to specific desired properties, being dynamic and/or static by changing the material of the disc, etc.

In addition, the positioning of the different discs, if present at all, and the at least one truss ring 3 can be varied along the rotational axis of the tire 1, such that one truss ring or disc can either be positioned between two discs, between two truss rings, at an outer surface of the tire 1, etc.

In addition, the positioning of the openings 8 delimited by the truss members 4 of respective truss rings 3, can be adapted to obtain specific dynamic or properties.

In a first embodiment, not shown in the figures, the tire comprises a single truss ring 3. In a second embodiment not shown in the figures, the tire 1 according to the invention comprises two truss rings 3, 17, the of the tire. In a third embodiment, the tire 1 comprises two discs between which a truss ring 3 is sandwiched.

The invention claimed is:
1. A tire (1) having a rotational axis and comprising
   a rubber tread portion (2) extending in circumferential direction of the tire (1) and being provided for contacting a ground surface and
   at least one truss ring (3) made of a rubber containing truss material having an E modulus of between 4-18 MPa and having
      i) opposing first outer and second outer surfaces contacting and extending along the tread portion (2) for supporting the vehicle on the tread portion (2), ii) first and second circumferential truss chords (5, 6) concentrically positioned with respect to the tread portion (2) forming, respectively, first and second truss chord members (10), wherein the first truss chord member is closer to the tread portion and the second truss chord member is closer to the rotational axis, iii) a truss web (7) forming truss web members (9) located between and interconnecting the first and second truss chord members, and iv) in the first outer surface extending along the rotational axis of the tire, a layer of multiple, adjacent triangular openings (8) each having first and second sides (19, 20) delimited by a pair of the truss web members (9) and a third side (21) delimited by the second circumferential truss chord member, wherein the ratio of the areas, at an outer surface of the truss ring (3), of the truss web members (9) with respect to the openings (8) between the truss web members (9) is comprised between 30/70 and 70/30, wherein the multiple triangular openings are positioned with respect to a tread pattern of the tread portion (2) having multiple lugs (13), such that the third sides of the openings are each positioned radially inward under' a lug (13) of the tread pattern, respectively.

2. A tire (1) as claimed in claim 1, wherein the ratio of the areas, at an outer surface of the truss ring (3), of the truss web members (9) with respect to the openings (8) between the truss web members (9) is comprised between 40/60 and 60/40.

3. A tire (1) as claimed in claim 2, wherein the ratio of the areas, at an outer surface of the truss ring (3), of the truss web members (9) with respect to the openings (8) between the truss web members (9) is 60/40.

4. A tire (1) as claimed in claim 1, wherein the triangular openings (8) of a row of triangular openings which are equidistant from the rotational axis of the tire (1) are congruent.

5. A tire (1) as claimed in claim 1, wherein the triangular openings (8) narrow from the first outer surface (14) of the truss ring (3) towards the second outer surface (15) of the truss ring (3).

6. A tire (1) as claimed in claim 5, wherein the triangular openings (8) narrow stepwise.

7. A tire (1) as claimed in claim 1, wherein the respective truss web members (9) have a substantially constant width at the first outer surface (14) of the truss ring (3).

8. A tire as claimed in claim 1, wherein one of the truss web members and the truss chord member (10) of a pair of truss web members and a truss chord member from the truss chord members forming a triangular opening (8) at the first outer surface (14) of the truss ring (3), delimit at least one angle (16) of the triangular opening (8) between 30°-55°.

9. A tire (1) as claimed in claim 1, wherein the at least one truss ring is a first and a second of the truss rings (3, 17) respectively extending axially over a first and a second length.

10. A tire as claimed in claim 9 further comprising at least one disc sandwiched between the first and the second of the truss rings and contacting and extending along the tread portion for supporting the vehicle on the tread portion.

* * * * *